United States Patent [19]

Hesse et al.

[11] Patent Number: 4,584,487
[45] Date of Patent: Apr. 22, 1986

[54] VEHICLE CONTROL ARRANGEMENT FOR MONITORING AND CONTROLLING A PLURALITY OF VEHICLE COMPONENTS

[75] Inventors: Karl-Heinz Hesse, Gehrden; Peter Liermann, Barsinghausen; Detlev Neuhaus, Langenhagen, all of Fed. Rep. of Germany

[73] Assignee: WABCO Westinghouse Fahrzeugbremsen GmbH, Hanover, Fed. Rep. of Germany

[21] Appl. No.: 657,108

[22] Filed: Oct. 2, 1984

[30] Foreign Application Priority Data

Oct. 4, 1983 [DE] Fed. Rep. of Germany ....... 3335932

[51] Int. Cl.⁴ ........................ B60Q 1/00; B62D 45/00
[52] U.S. Cl. ..................................... 307/10 R; 307/38; 340/52 F; 370/85
[58] Field of Search ..................... 307/9, 10 R, 10 LS, 307/38, 39, 140; 340/52 R, 52 F, 825.05, 825.08, 825.52; 370/85

[56] References Cited

U.S. PATENT DOCUMENTS

| | | | |
|---|---|---|---|
| 3,965,366 | 6/1976 | Surnida et al. | 307/10 R X |
| 4,419,666 | 12/1983 | Gurr et al. | 307/39 X |
| 4,459,591 | 7/1984 | Haubner et al. | 340/825.05 X |
| 4,463,341 | 7/1984 | Iwasaki | 340/825.05 X |
| 4,500,868 | 2/1985 | Tokitsu et al. | 340/52 F |
| 4,538,262 | 8/1985 | Sinniger et al. | 307/10 R X |

Primary Examiner—Harry E. Moose, Jr.
Assistant Examiner—Derek S. Jennings
Attorney, Agent, or Firm—G. E. Hawranko

[57] ABSTRACT

A component control arrangement for transit-type vehicles having a distributed plurality of vehicle components to be monitored and controlled, includes a number of function control modules, each being associated with a specific vehicle function; as for example, wheelskid, climate-control, and verification systems. The function control modules, each communicate in a multiplex arrangement over a shared data bus and a transceiver arrangement, with a distribution unit. The distribution units have an output configuration allowing connection to a variety of vehicle operating devices including lamps, switches, solenoid valves, and electric motors. The function control modules evaluate status indications originating from the vehicle operating devices and transmitted through the distribution units and a transceiver arrangement. The function control modules utilize the status indications to derive control instructions for the vehicle operating devices based on a predetermined set of vehicle operating and safety parameters.

8 Claims, 1 Drawing Figure

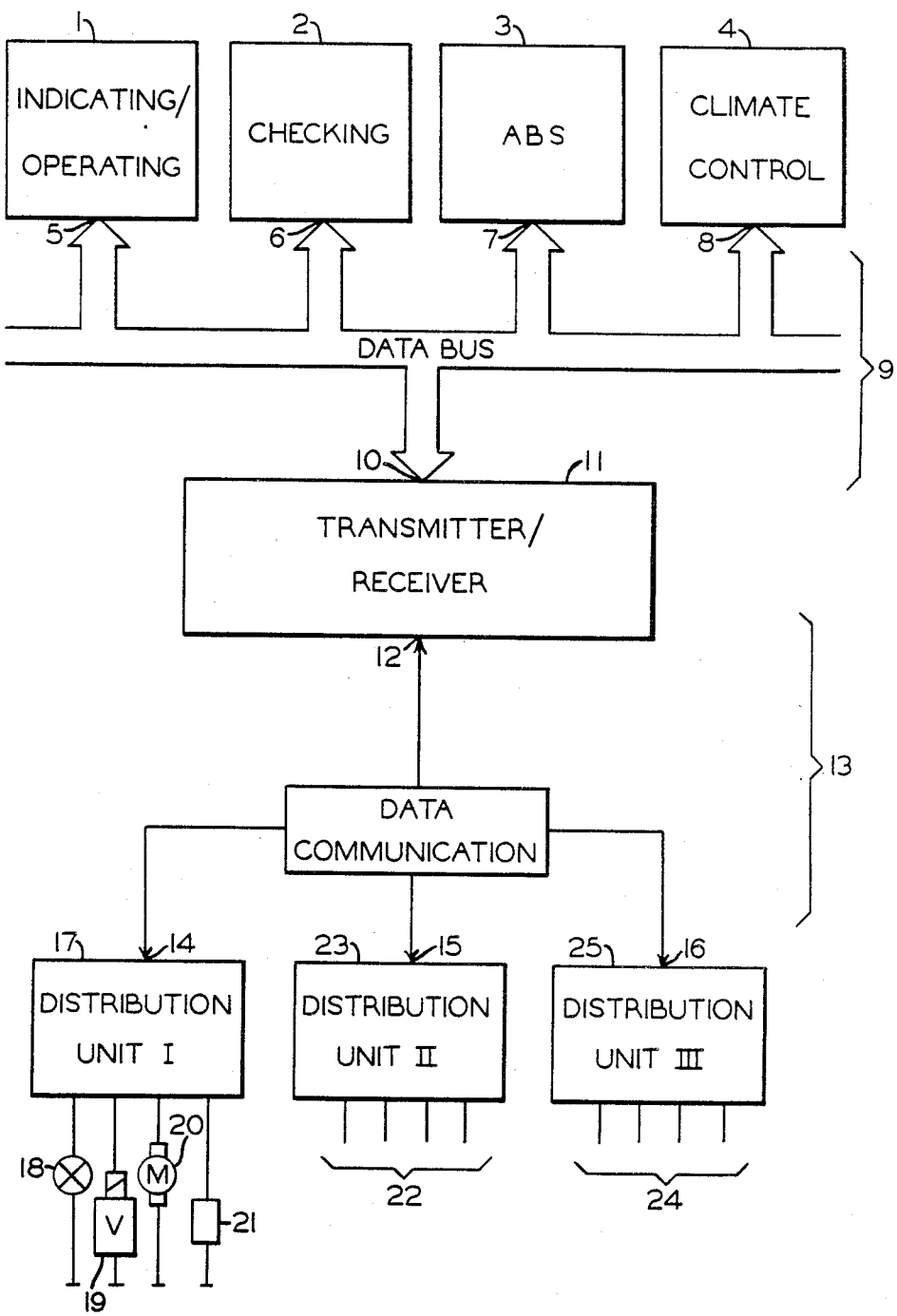

VEHICLE CONTROL ARRANGEMENT FOR MONITORING AND CONTROLLING A PLURALITY OF VEHICLE COMPONENTS

BACKGROUND OF THE INVENTION

This invention relates to a vehicle control arrangement for monitoring and controlling a plurality of vehicle components, especially on a transit-type vehicle having, among others, such components as a climate-control system, a condition, equipment verification system, and an indicating-operating system. Additionally, such a vehicle control arrangement could further monitor and control the anti-blocking system, or, as it is also known, the wheel-skid equipment. An example of an existing vehicle control arrangement can be found in the German Pat. No. DE2433025, which describes the device for controlling and checking electrical switching circuits of a motor vehicle. This known device includes a central transmitter and a number of receiving stations which output signals to operate switches and/or lamps, and responds back to the central transmitter on the condition of the switches and/or lamps. One disadvantage of this approach is the limited number of vehicle functions and types of functions that this control device can operate. A further disadvantage of this approach is that the design of the vehicle control apparatus interconnects a majority of the system components such that, in the event of a defective component, the entire transmitter receiving station arrangement may have to be replaced. It is also a disadvantage that, by restricting the output functions to a number of single-type outputs, for instance, operating a switch, it is not possible to assign a priority operation to a specific vehicle function. Nor is it possible, using this limited output configuration, to effectively design a vehicle component control arrangement independent of consideration of the receiving unit's capabilities.

SUMMARY OF THE INVENTION

It is, therefore, an object of the invention to provide a vehicle control arrangement for monitoring and controlling a plurality of vehicle components, which vehicle control arrangement can monitor and control the complete range of vehicle components and subsystems.

It is another object of the invention to provide such a vehicle control arrangement whereby system maintenance, expansion and/or reduction can be accomplished in a safe and economical manner, and can further allow for system design changes without consideration of the output configuration of the distribution units.

It is yet another object of the invention to provide a vehicle control arrangement having a signal output scheme whereby signals associated with vital vehicle operations, such as, for example, the wheel-skid equipment, are given a priority assignment.

It is an even further object to provide a rigid standardization only in the area of the connecting arrangement to the transceiver and vehicle device system components.

Briefly, the invention consists of a number of vehicle component modules, each of which can be associated with a vehicle component or subsystem, as, for instance, the climate-control, wheel-skid, or door-control systems. Each of the component modules receives, evaluates and transmits data in the form of requests, evaluations and interlocks reflecting the desired operating conditions of the vehicle components over a shared data bus. The data bus, in turn, directs this data to a transmitter/receiver multiplexing arrangement, which codes and decodes this data for transmission and/or reception over a data communication link. The data communication link is in communication with a number of distribution units, each having the capability to connect into a varied number of vehicle devices which include lamps, solenoid valves, electric motors, and operation sensors.

BRIEF DESCRIPTION OF THE DRAWINGS

FIG. 1 is a diagrammatic view of a vehicle component control arrangement constructed in accordance with the invention.

DESCRIPTION AND OPERATION

As seen in FIG. 1, the vehicle component control arrangement, as can be used on a bus or transit car, includes a number of vehicle component modules shown here as the indicating/operating module 1, the verification module 2, the ABS or wheel-skid module 3, and the climate-control module 4. It can be appreciated that additional modules can be included as well, for instance, a door control module.

The separately-mounted modules 1, 2, 3, 4 will each fulfill a special function. Module 1, the indicating-/operating module, is used to record the standard operating data of the vehicle, such as, for example, the speed, the motor rpm, the fuel consumption, the cooling water temperatures, etc. Exit signals from component devices, such as, rpm counters, temperature recorders, etc., are used by the indicating/operating module 1 to calculate the data to be indicated, which are then fed to an indicator panel (not shown).

The verification module 2 is used to check all vehicle components for operational safety and operating conditions, and can possibly be used to generate specific fault signals which could then be indicated via the indicating-/operating module 1.

The ABS module 3 is basically the control unit for the anti-blocking system. Certain vehicle sensors (not shown), which are used to determine vehicle velocity, deceleration, and wheel slip, generate signals reflecting these vehicle parameters which the ABS module 3 utilizes to produce the necessary control signals for the vehicle devices, such as, for example, the solenoid valve which activates air-powered vehicle brakes (not shown).

The climate-control module 4 contains the control elements required for the climate of the vehicle with respect to such conditions as vehicle temperature, vehicle fresh air supply and humidity for the passenger space of the vehicle. It can be appreciated that certain vehicle components work in conjunction with other components, such as, for example, temperature sensors of the climate-control module 4; whereas the control features of the climate-control module 4 activate other components, such as, ventilation motors and heaters. Additionally, the indicating/operating module 1 and the verification module 2 can operate in conjunction in the sense of collecting diagnostic data for vehicle components for later evaluation, for example, information on the location and nature of flaws recorded by the indicating/operating module 1.

The vehicle component modules 1, 2, 3 and 4 are connected via respective module communication terminals 5, 6, 7 and 8 to a bus communication terminal 10, which is part of a bidirectional shared data bus 9. The data bus 9 can interchange data between respective vehicle component modules 1, 2, 3 and 4 in one direction, and between a transmitter/receiver multiplexing module 11 in another direction. This exchange of data and signals over the bi-directional shared data bus 9 can be accomplished with the multiplexing system 11, 13 by way of order and cancel signals, which order and cancel signals constitute a type of hand-shake arrangement between the data bus 9, the vehicle component modules 1, 2, 3 and 4, and the transmitter/receiver module 11.

Multiplexing module 11 has an entry and exit terminal 12 which is connected to a data communication link 13, which, in this case, can be a hard-wired communication line. The combined multiplexing module 11 and communication link 13 form a total multiplexing system, which can be of either a time or a frequency multiplexing arrangement. The multiplexing system 11, 13 communicates with a number of distribution units, shown in FIG. 1 as distribution units I, II and III, having reference numbers 17, 23 and 25, respectively. The distribution units 17, 23 and 25 have respective multiplex entry and exit terminals 14, 15 and 16 which communicate with the multiplexing system 11, 13.

There can be approximately four vehicle component devices, or types of devices, connected to each of the distribution units 17, 23 and 25. For distribution unit I, reference number 17; a lamp 18, a solenoid valve 19, an electric motor 20, and a sensor 21 are connected thereto. All of the distribution units 17, 23 and 25 can be connected to a variety of vehicle component devices, as illustrated by the four types of devices 18, 19, 20 and 21 connected to the first distribution unit 17. Moreover, it can be appreciated that other types of vehicle component devices can be controlled by each of the distribution units 17, 23, 25 as well.

The multiplexing system 11, 13 transmits control signals between the transmitter/receiver module 11 and the distribution units 17, 23 and 25. In this manner, it is possible that vehicle component devices 18, 19, 20 and 21 may be queried continuously by the transmitter/receiver module 11. It is also possible that such components can be queried, or polled, at certain predetermined time intervals or specified times. It is also possible to utilize a priority polling arrangement whereby certain vehicle component devices can be queried or polled at a greater frequency or on a priority basis. This priority polling arrangement can be accomplished by use of a priority switching unit (not shown).

In operation, the vehicle component control arrangement will be explained by way of an example using the ABS module 3. The ABS module 3 generates certain data terms which are transmitted to the bi-directional shared data bus 9 over the module terminal 7 and the bus terminal 10. The transmitter/receiver module 11 arranges these data of the ABS module 3 in relation to their respective co-components which are, in this case, wheel sensors (not shown). The multiplexing system 11, 13 receives all required sensor exit signals transmitted by the respective devices which include sensors to monitor velocity, deceleration, and wheel slip from the respective distribution unit 17, 23 or 25. It is possible to equip the transmitter/receiver module 11 with a memory for retaining the successive exit signals of the vehicle components. In this case, the transmitter/receiver module 11 and the particular distribution unit will constantly exchange data and signals whether or not a request for such data and signals has been received by the module.

The above-mentioned sensor signals are evaluated by the ABS module 3 and applied in cases of vehicle blocking to produce control signals for a solenoid valve, shown typically by 19, used in the braking system (not shown). These control signals are transmitted as data units over the bi-directional shared data bus 9 and the multiplexing system 11, 13 to the distribution units and to the respective solenoid valve.

It is evident that vehicle component modules 1, 2 and 4 operate in a similar manner to component module 3 and can be expanded or reduced without a necessary modification to the multiplexing system 11, 13.

Although the hereinabove-described forms of embodiments of the invention constitute preferred forms, it can be appreciated that other modifications may be made thereto without departing from the scope of the invention as set forth in the appended claims. As an example, a microprocessor can be used for the vehicle component modules 1, 2, 3 or 4, whereby a program can perform the operation and evaluation processes. As an example of a modification to the multiplexing system, the entire arrangement can be provided in either a delta configuration or a circular configuration, and, moreover, the system may consist of either optical or pneumatic components in addition to the conventional electrical lines used for signal and control transfer.

Having now described the invention, what we claim as new and desire to secure by Letters Patent, is:

1. A component control arrangement for use on transit-type vehicles having a distributed plurality of vehicle components to be monitored and controlled, said component control arrangement comprising:
   (a) a plurality of function control modules, each having at least one communication terminal to receive and transmit electrical signals associated with the operation of the vehicle components;
   (b) said function control modules having disposed therein component operating means for deriving from a portion of such electrical signals, a set of operating instructions, such set of operating instructions being derived by said component operating means as a function of a plurality of predetermined vehicle safety and operating parameters and an evaluation of a second portion of such electrical signals, such second portion of said electrical signals originating from the vehicle components in the form of status indications;
   (c) a data bus member electrically coupled to each of said communication terminals of said plurality of function control modules;
   (d) a plurality of distribution units, each receptive of a predesignated portion of such set of control instructions;
   (e) transceiver means in communication with said data bus and said plurality of distribution units for transmitting such status indications and such set of control instructions between said component operating means and said distribution units; and
   (f) a plurality of vehicle operating devices connected to each one of said plurality of distribution units, each of said vehicle operating devices being operable, upon receiving such portion of such set of control instructions, to execute a predetermined set of vehicle operations and to generate at least a portion of such status indications readable by said component operating means upon execution of such predetermined set of vehicle operations by said plurality of vehicle operating devices.

2. A component control arrangement, as set forth in claim 1, wherein said transceiver means is a data receiver, transmitter arrangement employing a time-multiplexing communication format.

3. A component control arrangement, as set forth in claim 1, wherein said transceiver means is a data receiver, transmitter arrangement employing a frequency-multiplexing communication format.

4. A component control arrangement, as set forth in claim 1, wherein said component operating means includes a microprocessor programmable to evaluate and execute such set of control instructions and status indications.

5. A component control arrangement, as set forth in claim 1, wherein said transceiver means includes a memory means for storing at least two successive sets of such control instructions and status indications.

6. A component control arrangement, as set forth in claim 1, wherein said component operating means can generate such set of control instructions and read such status indications from any one of said plurality of vehicle operating devices on a priority basis.

7. A component control arrangement, as set forth in claim 1, wherein said plurality of vehicle operating devices can include an electric motor, lamps, switches, and solenoid valves.

8. A component control arrangement, as set forth in claim 1, wherein said distribution units are constructed having substantially similar input and output terminal configurations.

* * * * *